(12) United States Patent
Flynn

(10) Patent No.: US 10,299,219 B2
(45) Date of Patent: May 21, 2019

(54) TRANSMITTER, A RECEIVER, A DATA TRANSFER SYSTEM AND A METHOD OF DATA TRANSFER

(71) Applicant: ARM LIMITED, Cambridge (GB)

(72) Inventor: David Walter Flynn, Cambridge (GB)

(73) Assignee: ARM Limited, Cambridge (GB)

( * ) Notice: Subject to any disclaimer, the term of this patent is extended or adjusted under 35 U.S.C. 154(b) by 208 days.

(21) Appl. No.: 15/166,315

(22) Filed: May 27, 2016

(65) Prior Publication Data

US 2016/0374029 A1 Dec. 22, 2016

(30) Foreign Application Priority Data

Jun. 16, 2015 (GB) .................................. 1510545.5

(51) Int. Cl.
*G06F 13/42* (2006.01)
*H04W 52/22* (2009.01)
*H04L 1/00* (2006.01)
*H04L 12/801* (2013.01)

(52) U.S. Cl.
CPC .......... *H04W 52/221* (2013.01); *G06F 13/42* (2013.01); *G06F 13/4269* (2013.01); *H04L 1/00* (2013.01); *H04L 47/13* (2013.01)

(58) Field of Classification Search
None
See application file for complete search history.

(56) References Cited

U.S. PATENT DOCUMENTS

| 7,165,729 B2 | 1/2007 | Bradley et al. |
| 7,426,597 B1 * | 9/2008 | Tsu ..................... G06F 13/4018 710/307 |
| 9,600,191 B2 * | 3/2017 | Pawlowski ........... G06F 3/0619 |

FOREIGN PATENT DOCUMENTS

GB 2 418 036 3/2006

OTHER PUBLICATIONS

Combined Search and Examination Report for GB1510545.5 dated Jan. 19, 2016, 6 pages.
Examination Report dated Sep. 17, 2018 in GB Application No. 1510545.5, 5 pages.

* cited by examiner

*Primary Examiner* — Alex Skripnikov
(74) *Attorney, Agent, or Firm* — Nixon & Vanderhye P.C.

(57) ABSTRACT

A data transfer system, a method of data transfer and a corresponding transmitter and receiver are disclosed. A communication protocol between the transmitter and receiver is defined using a set of valid transmission states for communication from the transmitter to the receiver and a set of valid acknowledgement states for transmission from the receiver to the transmitter. A Hamming distance between patterns of zeroes, and between patterns of ones, in valid states of each of these sets is at least one and the transmitter is arranged to transition between a number of transmission states in response to the reception of an acknowledgement state from the receiver which matches a transmission state it has sent to the receiver on a request bus. A communication protocol which is robust across a multi-voltage and/or clock domain interface is thus provided.

21 Claims, 10 Drawing Sheets

| TXREQ_o[2] | TXREQ_o[1] | TXREQ_o[0] | Function |
|---|---|---|---|
| 0 | 0 | 1 | Standby/Power-Down |
| 0 | 1 | 0 | Data-Transfer(A) |
| 1 | 0 | 0 | Data-Transfer(B) |
| 1 | 1 | 1 | Test mode signalling |

FIG. 3A

| RXREQ_i[2] | RXREQ_i[1] | RXREQ_i[0] | Function |
|---|---|---|---|
| 0 | 0 | 0 | Illegal / clamped-low state |
| 0 | 0 | 1 | Standby/Power-Down |
| 0 | 1 | 1 | Illegal / transitory state |
| 0 | 1 | 0 | Data-Transfer(A) |
| 1 | 1 | 0 | Illegal / transitory state |
| 1 | 0 | 0 | Data-Transfer(B) |
| 1 | 1 | 1 | Test mode signalling |

FIG. 3B

| RXACK_o[2] | RXACK_o[1] | RXACK_o[0] | Function |
|---|---|---|---|
| 0 | 0 | 1 | Standby/Power-Down |
| 0 | 1 | 0 | Data-Transfer(A) |
| 1 | 0 | 0 | Data-Transfer(B) |
| 1 | 1 | 1 | Test mode signalling |

FIG. 3C

| RXACK_o[2] | RXACK_o[1] | RXACK_o[0] | Function |
|---|---|---|---|
| 1 | 0 | 0 | Standby/Power-Down |
| 0 | 0 | 1 | Data-Transfer(A) |
| 0 | 1 | 0 | Data-Transfer(B) |
| 1 | 1 | 1 | Test mode signalling |

FIG. 3D

| TXACK_i[2] | TXACK_i[1] | TXACK_i[0] | Function |
|---|---|---|---|
| 0 | 0 | 0 | Illegal / clamped-low state |
| 0 | 0 | 1 | Standby/Power-Down |
| 0 | 1 | 1 | Illegal / transitory state |
| 0 | 1 | 0 | Data-Transfer(A) |
| 1 | 1 | 0 | Illegal / transitory state |
| 1 | 0 | 0 | Data-Transfer(B) |
| 1 | 1 | 1 | Test mode signalling |

FIG. 3E

TRANSMITTER, A RECEIVER, A DATA TRANSFER SYSTEM AND A METHOD OF DATA TRANSFER

This application claims priority to GB Patent Application No. 1510545.5 filed Jun. 16 2015, the entire content of which is hereby incorporated by reference.

TECHNICAL FIELD

The present disclosure relates to data processing. More particularly it relates to the transfer of data from a transmitter to a receiver.

BACKGROUND

There may be the need in a data processing system for one component ("a transmitter") to transfer data to another component ("a receiver"). In order to support the reliable transfer of data between the two a communication protocol may be employed which uses a pair of request and acknowledge handshake signals: for the transmitter to indicate its readiness to transfer a bundle of data bits to the receiver; and for the receiver to indicate its readiness to receive that bundle of data bits. Once this mutual readiness has been established, a transmitter can then transfer the data to the receiver. However, it may further be the case that the transmitter and receiver reside in notably different voltage environments, which can have significant consequences for the manner in which the signals propagate between the transmitter and receiver (in both directions) and in such a situation a protocol may be adopted where the basic two phase handshake protocol is extended to a more conservative four phase protocol, where both rising and falling edge transitions are signalled across the interface. Alternatively, in particular in the context of high speed serial communications, a differential signalling approach may be adopted where data and inverted data are both signalled in parallel across the interface and are converted back to a single ended value at the receiver, which is deemed to be valid when both the original data and the inverted data have stabilised within specification voltage ranges. Moreover, transmission interfaces may have input/output isolation and cross between asynchronous clock domains. As such the timing of rise and fall times across such interfaces may have to be carefully managed by design.

SUMMARY

In one example embodiment there is a data transfer system comprising: a data bus, a request bus and an acknowledge bus; a transmitter to assert a current transmission state on the request bus in accordance with a communication protocol, wherein the current transmission state is indicative of a state of the transmitter with respect to data transfer via the data bus; and a receiver to read a received transmission state from the request bus in accordance with the communication protocol and to assert an acknowledgement state on the acknowledge bus when the received transmission state is a valid transmission state of a set of valid transmission states according to the communication protocol, wherein the transmitter is arranged to read a received acknowledgement state from the acknowledge bus in accordance with the communication protocol, and the transmitter is responsive to reception of a valid acknowledgement state of a set of valid acknowledgement states according to the communication protocol, when the valid acknowledgement state corresponds to the state of the transmitter, to transition the state of the transmitter with respect to data transfer via the data bus, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

In another example embodiment there is a method of data transfer in a data transfer system comprising a data bus, a request bus and an acknowledge bus, the method comprising the steps of: asserting a current transmission state of a transmitter on the request bus in accordance with a communication protocol, wherein the current transmission state is indicative of a state of the transmitter with respect to data transfer via the data bus; reading a received transmission state from the request bus in accordance with the communication protocol; asserting an acknowledgement state on the acknowledge bus when the received transmission state is a valid transmission state of a set of valid transmission states according to the communication protocol; reading a received acknowledgement state from the acknowledge bus in accordance with the communication protocol; and transitioning the state of the transmitter with respect to data transfer via the data bus on reception of a valid acknowledgement state of a set of valid acknowledgement states according to the communication protocol, when the valid acknowledgement state corresponds to the state of the transmitter, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

In another example embodiment there is a data transfer system comprising: means for transferring data; means for transferring requests; means for transferring acknowledgements; means for asserting a current transmission state of a transmitter via the means for transferring requests in accordance with a communication protocol, wherein the current transmission state is indicative of a state of the transmitter with respect to data transfer via the means for transferring data; means for reading a received transmission state from the means for transferring requests in accordance with the communication protocol; means for asserting an acknowledgement state via the means for transferring acknowledgements when the received transmission state is a valid transmission state of a set of valid transmission states according to the communication protocol; means for reading a received acknowledgement state from the means for transferring acknowledgements in accordance with the communication protocol; and means for transitioning the state of the transmitter with respect to data transfer via the means for transferring data on reception of a valid acknowledgement state of a set of valid acknowledgement states according to the communication protocol, when the valid acknowledgement state corresponds to the state of the transmitter, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

In another example embodiment there is a transmitter comprising: state transmission circuitry to assert a current transmission state on a request bus in accordance with a communication protocol, wherein the current transmission state is indicative of a state of the transmitter with respect to data transfer via a data bus; and state reception circuitry to read a received acknowledgement state from an acknowledge bus in accordance with the communication protocol, wherein the transmitter is responsive to reception of a valid acknowledgement state of a set of valid acknowledgement states according to the communication protocol, when the valid acknowledgement state corresponds to the state of the transmitter, to transition the state of the transmitter with respect to data transfer via the data bus, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

In another example embodiment there is a receiver comprising: state reception circuitry to read a received transmission state from a request bus in accordance with a communication protocol, wherein the current transmission state is indicative of a state of a transmitter with respect to data transfer via a data bus; and state transmission circuitry to assert an acknowledgement state on an acknowledge bus when the received transmission state is a valid transmission state of a set of valid transmission states according to the communication protocol, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

BRIEF DESCRIPTION OF DRAWINGS

The present techniques will be described further, by way of example only, with reference to embodiments thereof as illustrated in the accompanying drawings, in which:

FIG. 3A shows a set of valid current transmission states which a transmitter may assert on a request bus in one embodiment;

FIG. 3B shows a set of received transmission states which the receiver is arranged to interpret from the request bus, including both the valid transmission states shown in FIG. 3A and further invalid transmission states which may be received, in one embodiment;

FIG. 3C and FIG. 3D show two alternative sets of valid acknowledgement states which the receiver is arranged to assert on the acknowledge bus when in receipt of a valid transmission state from the transmitter in respective embodiments;

FIG. 3E shows a set of acknowledgement states which the transmitter is arranged to read from the acknowledgement bus, including both a set of valid acknowledgement states and a set of invalid acknowledgement states in one embodiment;

DESCRIPTION OF EMBODIMENTS

Figure 1:
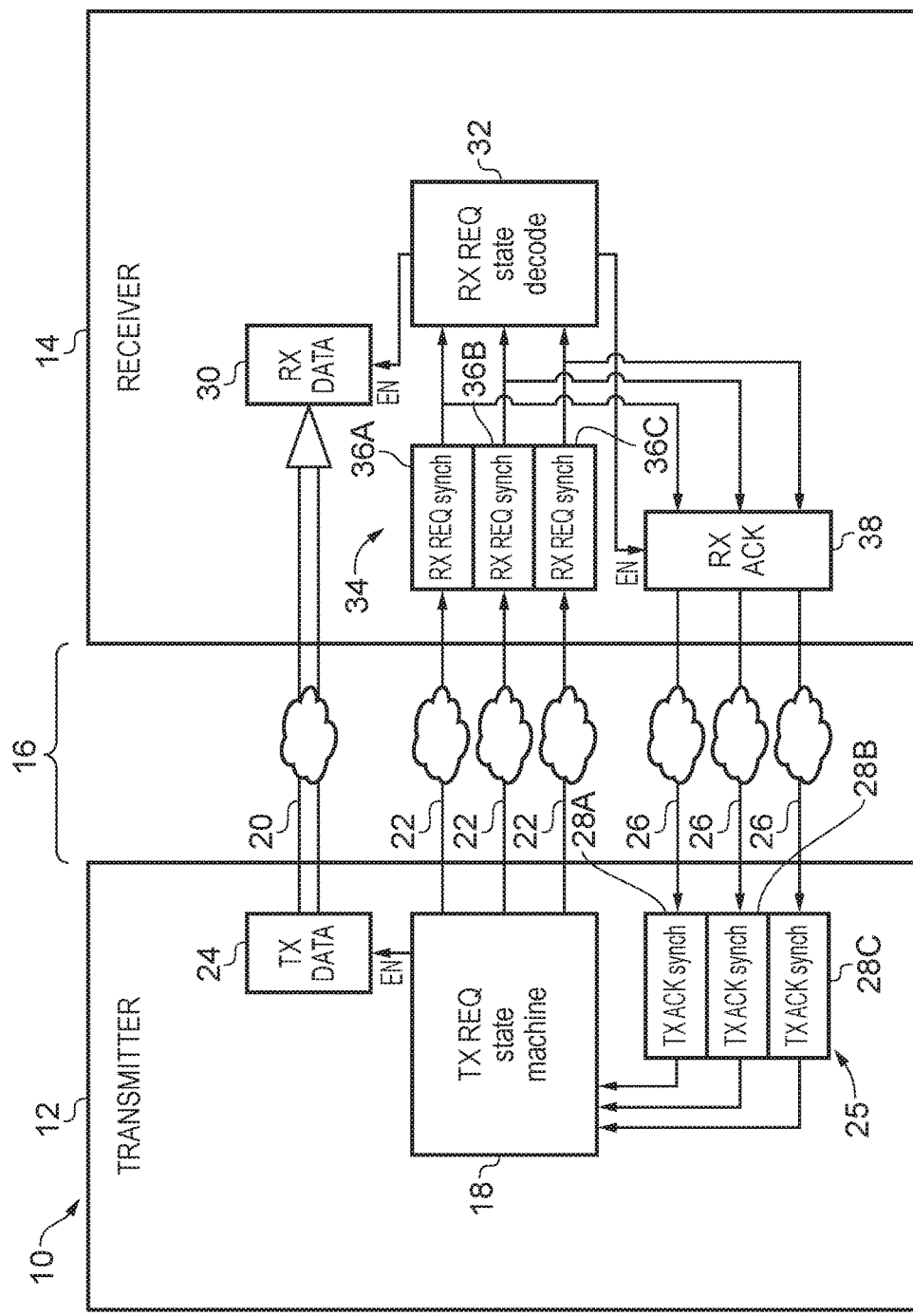
FIG. 1 schematically illustrates a data transfer system in one embodiment.

At least some embodiments provide a data transfer system comprising: a data bus, a request bus and an acknowledge bus; a transmitter to assert a current transmission state on the request bus in accordance with a communication protocol, wherein the current transmission state is indicative of a state of the transmitter with respect to data transfer via the data bus; and a receiver to read a received transmission state from the request bus in accordance with the communication protocol and to assert an acknowledgement state on the acknowledge bus when the received transmission state is a valid transmission state of a set of valid transmission states according to the communication protocol, wherein the transmitter is arranged to read a received acknowledgement state from the acknowledge bus in accordance with the communication protocol, and the transmitter is responsive to reception of a valid acknowledgement state of a set of valid acknowledgement states according to the communication protocol, when the valid acknowledgement state corresponds to the state of the transmitter, to transition the state of the transmitter with respect to data transfer via the data bus, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

The present technique proposes a communication (interface) protocol according to which a number of valid transmission states for the transmitter are defined, and the transmitter uses the request bus in order to indicate its current state with a respect to data transfer via the bus by asserting one of the valid transmission states on the request bus. On the other side of the interface, the receiver reads the request bus to determine a transmission state of the transmitter in the knowledge of the same communication protocol. If the received transmission state which the receiver reads from the request bus is one of the known valid transmission states according to the communication protocol, then the receiver responds by asserting an acknowledgement state on the acknowledge bus. This may simply be a bit-identical copy of the valid transmission state read by the receiver from the request bus, but may also take a different bit assertion format having the same semantic meaning. The transmitter reads an acknowledgement state from the acknowledge bus, and when this acknowledgement state is one of a set of valid acknowledgement states according to the communication protocol and further this valid acknowledgement state corresponds to the state of the transmitter then the transmitter responds by transitioning its state with respect to the data transfer by the data bus. As mentioned above, this could be because the acknowledgement state is bit identical to the transmission state which the transmitter asserted on the request bus, or it could be the case that the transmitter understands (according to the communication protocol) that this valid acknowledgement state, although defined to have a different asserted bit format means, the same transmitter state as was indicated by the transmission state which it asserted on the request bus.

The particular manner in which the transmitter transitions its state, the number of possible states and the legal paths between them may take a variety of forms, but may for example be provided by a state machine which allows transitions between defined states of a state diagram and via defined paths (according to certain conditions) between those states. In order to support the reliable interpretation of the transmission states by the receiver and conversely of the acknowledgement states by the transmitter, the communication protocol defines the set of valid transmission states such that patterns of zeroes in the valid transmission states have a Hamming distance between one another of at least one. Similarly, patterns of ones in the valid transmission states have a Hamming distance between one another of at least one. In the same way, the set of valid acknowledgement states is defined such that patterns of zeroes in the valid acknowledgement states have a Hamming distance between one another of at least one, and patterns of ones in the valid acknowledgement states have a Hamming distance between one another of at least one. This feature of the communication protocol addresses an issue which may arise when the transmitter and receiver operate in different voltage domains, due to the effect that this can have on the timing of transition of rise and fall times of signals across a boundary between these two components. Indeed, such a situation may have the effect that a rising edge may propagate faster than a falling edge or vice versa. As a consequence, a bit of a transmission state/acknowledgement state asserted on the request bus/acknowledge bus respectively may temporarily be detected in the wrong state in association with other bits of the respective signal which have already reached their correct final state, resulting in a transmission state read on the request bus by the receiver or an acknowledgement state read on the acknowledge bus by the transmitter which does not correspond to the transmission state asserted on the request bus by the transmitter or the acknowledgement state asserted on the acknowledge bus by the receiver respectively. By defining the valid transmission and acknowledgement states as being comprised within sets whose components present patterns of both ones and zeroes which each have mutual Hamming distances of at least one, the mis-recognition of one of these intermediate states as the true communicated state of its originator is avoided. In other words, two valid transmission states of the set of valid transmission states must respectively have a pattern of zeroes which differs from the other pattern by a Hamming distance of at least one. The same rule applies to the patterns of ones in the set of valid transmission states. Similarly two valid acknowledgement states of the set of valid acknowledgement states must respectively have a pattern of zeroes (ones) which differs from the other pattern of zeroes (ones) by a Hamming distance of at least one. Reliable communication of the current transmission state of the transmitter to the receiver, and acknowledgement of that state by the receiver back to the transmitter is thus supported, without needing to resort to individual request and acknowledge handshakes for both rising and falling edge transitions of each signal crossing the interface. Similarly, an alternative approach of using differential signalling and the consequent doubling of the data path bandwidth is also avoided.

The particular configuration of the set of valid transmission states and the set of valid acknowledgement states may take a variety of forms, but in some embodiments the set of valid transmission states and the set of valid acknowledgement states each have constant parity value. Thus for example, in such embodiments the set of valid transmission states all have the same parity value as one another and this then provides the receiver with a way of identifying transitions between valid transmission states (which do not involve a change in parity of the signal) and a change (perhaps only temporary) to an invalid transmission state (which will involve a change in parity value of the signal). The same principle applies to the recognition of my acknowledgement state transitions by the transmitter.

The set of valid transmission states and the set of valid acknowledgement states may relate only to "true" data transfer via the data bus (for example indicating a number of valid data transfer transmission states and a standby state), but in some embodiments the set of valid transmission states and the set of valid acknowledgement states each comprise a test mode state which has the constant parity value. The provision of such a test mode state supports the ability of the data transfer system to self-test, for example to individually test bit transmission paths of a multi-bit data bus and the test mode state can reliably be recognised by the receiver when asserted by the transmitter and conversely the transmitter can reliably recognise a valid acknowledgement of this indicated test mode state received from the receiver, in that the test mode state also has the same parity value as the set of valid transmission states and of the set of valid acknowledgment states.

The particular manner in which the data transfer system makes use of such a test mode state indicated by the transmitter may take a variety of forms, but in some embodiments the data bus comprises a transmitter-to-receiver data bus and a receiver-to-transmitter data bus, and the receiver is responsive to the received transmission state being the test mode state to transmit on the receiver-to-transmitter data bus data received on the transmitter-to-receiver data bus. Thus, when the transmitter asserts the test mode state the receiver may respond by entering a loop-back configuration in which data received on the transmitter-to-receiver data bus is returned to the transmitter via the receiver-to-transmitter data bus. Returning this data may comprise simply reflecting back the bit values received, or may involve this data being transmitted in another format (with inverted data bits for example). Thus the transmitter can test one or more bits of the two data buses in order to check that the receiver is faithfully receiving the data which the transmitter transmits. Furthermore, by virtue of the fact that the receiver is known by the transmitter (according to the communication protocol) to enter such a loop-back test mode in response to valid assertion of the test mode state by the transmitter, the transmitter is able to fully exercise the interface wiring and various bit ordering checks, without needing to have a complex or detailed model of the receiver with which it is seeking to establish reliable communication. This is useful in the context of a data transfer system being established by a user who may have detailed knowledge of the particular configuration with which they are setting up the transmitter, but where the receiver is provided by a third party and such complex or detailed information about the internal configuration of the receiver may not be available.

As mentioned above, the acknowledgement state returned to the transmitter by the receiver may be bit-identical to the transmission state which the receiver reads from the request bus, but this is not necessary and the two may differ as long as the meaning of the respective transmission states and acknowledgement states involved are defined by the communication protocol to be the same. Accordingly, in some embodiments a bit pattern of the acknowledgement state asserted on the acknowledge bus by the receiver is identical to the received transmission state read by the receiver from the request bus. Alternatively in other embodiments a bit pattern of the acknowledgement state asserted on the acknowledge bus by the receiver is non-identical to the received transmission state read by the receiver from the request bus.

In addition to the valid transmission and acknowledgement states according to the communication protocol which relate to active data transfer, and possibly to the above-mentioned test mode state, a further standby state may be defined within each of the set of valid transmission states and the set of valid acknowledgement states for use when the transmitter is not actively performing data transfer via the data bus. Hence, in some embodiments the set of valid transmission states and the set of valid acknowledgement states each comprise a standby state in which the transmitter does not seek to perform data transfer via the data bus.

When the transmitter is not seeking to transfer data via the data bus of the data transfer system it may be the case that the transmitter in such a situation enters a powered-down state (until it needs to wake up to begin data transfer again). In order to support the stability of the data transfer system in such a situation, in some embodiments the transmitter comprises clamping circuitry to hold the current transmission state asserted on the request bus in a powered-down state which is not comprised in the set of valid transmission states according to the communication protocol, and the transmitter is arranged to enter a transmitter low-power state when the powered-down state is asserted on the request bus, and the receiver is responsive to reading the powered-down state from the request bus to enter a receiver low-power state. The activation of the clamping circuitry ensures that the state of the request bus is held in a configuration which the receiver can recognise as not being a valid transmission state according to the communication protocol, but nevertheless being defined according to the communication protocol as indicating that the transmitter has moved into its powered-down state. In response, rather than asserting a corresponding acknowledgement of this state on the request bus, the receiver then also enters its own low-power state, since no active data transfer is currently expected.

The manner in which the clamping circuitry maintains the powered-down state on the request bus may take a variety of forms, but in some embodiments the request bus is clamped active-low for the powered-down state.

When the transmitter resumes seeking to perform data transfer via the data bus, the clamping circuitry will be deactivated in that it will no longer hold the current transmission state asserted on the request bus in the powered-down state, and in embodiments in which the powered-down state is asserted by the request bus being clamped active-low, then the receiver can recognise that the transmitter once again wishes to begin data transfer, by a change in any bit on the request bus. Accordingly, in some embodiments the receiver comprises wake-up circuitry responsive to a change in value of any bit on the request bus to cause the receiver to exit the receiver low-power state.

The clamping circuitry may be configured to hold the current transmission state in a standby state, which may or may not be identical with the powered-down state, but nevertheless in some embodiments the transmitter comprises clamping circuitry to hold the current transmission state asserted on the request bus in the standby state, and the transmitter is arranged to enter a transmitter low-power state when the clamping circuitry holds the current transmission state asserted on the request bus in the standby state, and the receiver is responsive to reading the standby state from the request bus to enter a receiver low-power state. Thus, the transmitter may make use of the standby state in order to indicate that no active data transfer is being sought and to enter its low-power state. Correspondingly, the receiver can then respond to the recognition of the standby state being asserted on the request bus to enter its own low-power state.

The standby state may take a variety of forms, but in some embodiments may comprise a single bit being asserted on the request bus. When this is the case some embodiments provide that the standby state is a multi-bit signal in which a single bit is asserted, and the receiver comprises wake-up circuitry responsive to the single bit not being asserted to cause the receiver to exit the low-power state. The wake-up circuitry of the receiver then need only monitor the status of that corresponding single bit, in particular that the single bit is no longer being asserted, to cause the receiver to exit low-power state. Since the standby state is defined as a valid (although not active) transmission state for the transmitter, any other valid transmission state that the transmitter may assert on the request bus can then satisfy the requirement of the Hamming distance for the patterns of ones (and also for the patterns of zeroes) being at least one, by ensuring that all other valid transmission states in which active data transfer is required are defined such that this single bit is not asserted and the wake-up circuitry can expediently be provided by a single component, for example, merely using a NOT gate in order to recognise a received non-assertion of this single bit and to then generate a corresponding asserted wake-up signal. Of course, inversion of the bit is not strictly necessary and the wake-up circuitry could be defined such that an "asserted" wake-up signal is active-low (and the recipient of that wake-up signal (e.g. a power control unit of the receiver) can correspondingly recognise that an active-low (i.e. zero) assertion of the single bit wake-up signal should be responded to by causing the receiver to exit its low power state.

In some embodiments when the transmitter exits the transmitter low-power state in preparation for data transfer via the data bus and asserts the current transmission state on the request bus, the transmitter is arranged to enter a transmitter low-power mode until a change in the received acknowledgement state occurs on the acknowledge bus. It may be the case that the time taken for signals to propagate from the transmitter to the receiver and for the receiver to wake up in response to the transmitter indicating that it has exited its transmitter low-power state is sufficiently long that power saving benefit may be gained by returning the transmitter to some variety of low-power mode whilst the receiver wakes up and asserts the corresponding change in the received acknowledgement state on the acknowledge bus, to which the transmitter can then respond (e.g. by having its own wake-up circuitry configured to recognise this change) to continue into the relevant stages of the communication protocol for data transfer.

The set of valid transmission states may be configured in a variety of ways, but in some embodiments the set of valid transmission states comprises two active data transmission states used by the transmitter when actively asserting valid data on the data bus, and any active change in a data value asserted on the data bus by the transmitter is accompanied by a change between the two active data transmission states. The provision of these two active data transmission states thus means that any change in the data value on the data bus can be indicated by the transmitter, and recognised by the receiver, by a corresponding change between the two active data transmission states. Continuous data transfer is then characterised by the transmitter toggling between these states.

The manner in which the receiver responds to such active data transmission states may take a variety of forms, but in some embodiments the receiver is responsive to reading one of the two active data transmission states from the request bus to sample data from the data bus. Accordingly, the receiver can reliably sample data at corresponding indicated points in the progression of changing data asserted on the data bus by the transmitter.

The transmitter and the receiver may be provided in clock domains which differ from one another, i.e. the interface between them is asynchronous, and thus in some embodiments the transmitter and the receiver are in different clock domains, and the receiver comprises receiver synchronisation circuitry to sample the request bus in a clock domain of the receiver to provide signals for receiver decode circuitry to determine the received transmission state, and the transmitter comprises transmitter synchronisation circuitry to sample the acknowledgment bus in a clock domain of the transmitter to provide signals for transmitter decode circuitry to determine the received acknowledgement state. The provision of respective synchronisation circuitry in the receiver and the transmitter thus enables the signals received from the opposite communication partner to be aligned with the timing of the clock domain of the component which receives those signals.

In some embodiments the receiver comprises multiple data reception buffers individually corresponding to multiple data sources of data to be transferred via the data bus, the multiple data reception buffers are each arranged to provide a readiness signal for transmission to the transmitter, and the transmitter is responsive to at least one readiness signal indicating that the corresponding data reception buffer is ready to receive data to select a data source for data transfer via the data bus and to indicate the data source via the data bus. Thus, rather than only one data source providing the data to be transferred via the data thus by the transmitter, the transmitter can therefore support data transfer for multiple data sources. The data reception buffers in the receiver which are arranged to receive data from their respective data sources on the transmitter side may for example only have a limited capacity for holding received data and therefore may not always be in a position to receive further data. When this is (for whatever reason) the case, the provision of a readiness signal transmitted to the transmitter allows the transmitter to select a data source for data transfer via the bus which is known to be ready, and efficient and fuller usage of the data bus is then supported.

The readiness signals may be communicated to the transmitter in a variety of ways, but in some embodiments the data transfer system comprises a readiness bus to carry the readiness signals for the multiple data reception buffers. In other words, a dedicated communication channel is provided to communicate these readiness signals.

The communication of these readiness signals may however be incorporated into the acknowledgement bus and in some embodiments the acknowledgment bus is arranged to carry the readiness signals for the multiple data reception buffers. This may be effected by a defined protocol for signals transmitted on the path or paths of the acknowledgement bus, or may be one or more additional paths (wires) provided within the acknowledgement bus to carry these readiness signals.

At least some embodiments provide a method of data transfer in a data transfer system comprising a data bus, a request bus and an acknowledge bus, the method comprising the steps of: asserting a current transmission state of a transmitter on the request bus in accordance with a communication protocol, wherein the current transmission state is indicative of a state of the transmitter with respect to data transfer via the data bus; reading a received transmission state from the request bus in accordance with the communication protocol; asserting an acknowledgement state on the acknowledge bus when the received transmission state is a valid transmission state of a set of valid transmission states according to the communication protocol; reading a received acknowledgement state from the acknowledge bus in accordance with the communication protocol; and transitioning the state of the transmitter with respect to data transfer via the data bus on reception of a valid acknowledgement state of a set of valid acknowledgement states according to the communication protocol, when the valid acknowledgement state corresponds to the state of the transmitter, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

At least some embodiments provide a data transfer system comprising: means for transferring data; means for transferring requests; means for transferring acknowledgements; means for asserting a current transmission state of a transmitter via the means for transferring requests in accordance with a communication protocol, wherein the current transmission state is indicative of a state of the transmitter with respect to data transfer via the means for transferring data; means for reading a received transmission state from the means for transferring requests in accordance with the communication protocol; means for asserting an acknowledgement state via the means for transferring acknowledgements when the received transmission state is a valid transmission state of a set of valid transmission states according to the communication protocol; means for reading a received acknowledgement state from the means for transferring acknowledgements in accordance with the communication protocol; and means for transitioning the state of the transmitter with respect to data transfer via the means for transferring data on reception of a valid acknowledgement state of a set of valid acknowledgement states according to the communication protocol, when the valid acknowledgement state corresponds to the state of the transmitter, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

At least some embodiments provide a transmitter comprising: state transmission circuitry to assert a current transmission state on a request bus in accordance with a communication protocol, wherein the current transmission state is indicative of a state of the transmitter with respect to data transfer via a data bus; and state reception circuitry to read a received acknowledgement state from an acknowledge bus in accordance with the communication protocol, wherein the transmitter is responsive to reception of a valid acknowledgement state of a set of valid acknowledgement states according to the communication protocol, when the valid acknowledgement state corresponds to the state of the transmitter, to transition the state of the transmitter with respect to data transfer via the data bus, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

At least some embodiments provide a transmitter comprising: state reception circuitry to read a received transmission state from a request bus in accordance with a communication protocol, wherein the current transmission state is indicative of a state of a transmitter with respect to data transfer via a data bus; and state transmission circuitry to assert an acknowledgement state on an acknowledge bus when the received transmission state is a valid transmission state of a set of valid transmission states according to the communication protocol, wherein a Hamming distance between patterns of zeroes, and a Hamming distance between patterns of ones, in valid transmission states of the set of valid transmission states is at least one, and wherein a Hamming distance between patterns of zeroes, and a Hamming distance between patterns of ones, in valid acknowledgement states of the set of valid acknowledgement states is at least one.

Some particular embodiments will be now described with reference to the figures.

FIG. 1 schematically illustrates a data transfer system 10 comprising a transmitter 12, a receiver 14 and an interface 16 between them. The transmitter 12 comprises a state machine 18 which defines the current state of the transmitter with respect to data transfer via a data bus 20 which forms part of the interface 16. The state machine 18 is coupled to a request bus 22 which in the illustrated embodiment comprises three parallel paths such that a three-bit signal may be transmitted by the request bus. The transmitter 12 further comprises data transmission circuitry 24 which is responsive to the state currently held by the state machine 18, in particular by the reception of an enable signal EN received from the state machine 18, to assert data for transfer to the receiver 14 on the data bus 20 when an appropriate corresponding state is held by the state machine 18. The transmitter 12 further comprises synchronisation circuitry 25 which is coupled to the acknowledge bus 26, which itself forms part of the interface 16. The synchronisation circuitry 25 comprises three independent synchronisation circuitry components 28A, 28B and 28C which are each coupled to one path of the acknowledgement bus 26, in order to synchronise the signal received on that respective path into the clock domain of the transmitter 12. A corresponding three-bit acknowledgement state received by the synchronisation circuitry 25 is passed to the state machine 18, which may then (as will be described in more detail below) transition to a new state in response thereto.

The receiver 14 comprises data reception circuitry 30 which, when enabled by the reception of the enable signal EN from the request state decode circuitry 32, samples the data received on the data bus 20 from the data transmission circuitry 24 of the transmitter 12. The request bus 22 is coupled to receiver synchronisation circuitry 34 which comprises three individual synchronisation circuitry units 36A, 36B and 36C, which have a configuration to generate a corresponding synchronised request state in the clock domain of the receiver 14 from the three-bit signal received on the request bus 22 from the transmitter 12. To manage clock domain boundary crossing the three bits of the request input are independently synchronised (which is possible due to the independent one-hot state encoding) and logically disambiguated at the receiver by decoding after the synchronisation register stages 36A-36C. This ensures that multi-bit synchronisation does fail if and when inputs change close to the sampling clock edge of the receiving synchronisers. This synchronised three-bit state is received by state decode circuitry 32, which determines whether the received transmission state on the request bus 22 is one of a set of valid transmission states. This being the case, and if the valid transmission state corresponds to active data transfer via the data bus 20 from the transmitter 12, the state decode circuitry 32 asserts the enable signal EN to cause the data reception circuitry 30 to sample the multi-bit data signal received on the data bus 20. The synchronised signal generated by the receiver synchronisation circuitry 34 is also passed to the receiver acknowledgement state generation circuitry 38 which is also activated by a corresponding enable signal EN received from the state decode circuitry 32 to assert an acknowledgement state on the acknowledge bus 26. In particular, the state decode circuitry 32 is arranged to only enable the receiver acknowledgement generation circuitry 38 to do this when the received transmission state read from the request bus 22 is one of the set of valid transmission states according to the communication protocol defined for this transmitter/receiver pair.

Figure 2:
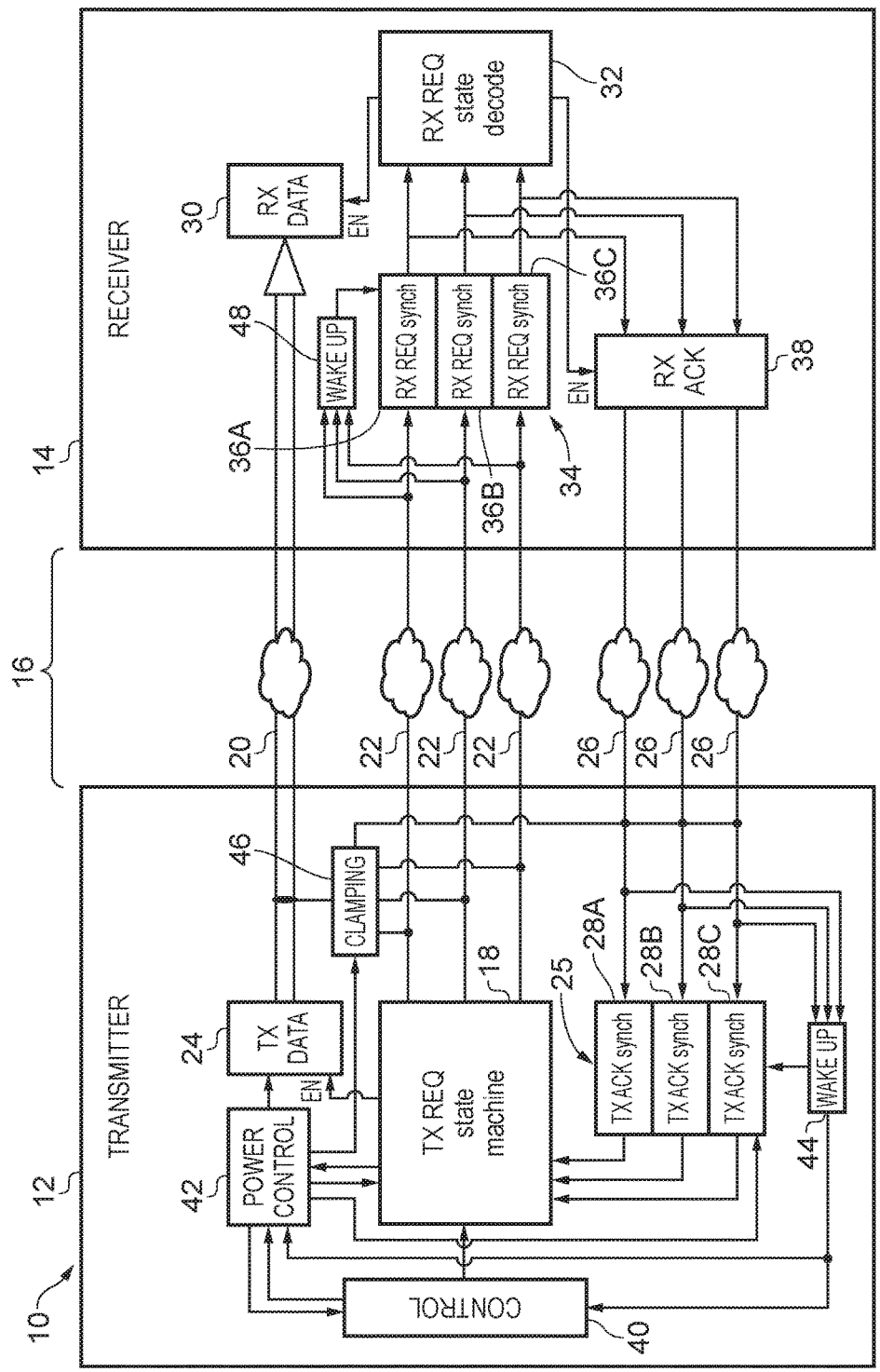
FIG. 2 schematically illustrates in more detail the components of the transmitter and receiver shown in FIG. 1.

FIG. 2 schematically illustrates the same data transfer system 10 as shown in FIG. 1, with some additional components, which are provided in one embodiment. All components of FIG. 1 are repeated in FIG. 2 and given the same reference numerals, and their description is not repeated here. The transmitter 12 in FIG. 2 further illustrates control circuitry 40, power control circuitry 42, wake up circuitry 44 and clamping circuitry 46. Overall control of the transmitter 12 is maintained by the control circuitry 40 and control signals from the control circuitry 40 may be provided to all components of the transmitter 12, although only those of particular relevance to the present discussion are explicitly illustrated in FIG. 2 for clarity. The state machine 18 of the transmitter 12 generally operates relatively independently of the control circuitry 40 in that it can transition between the defined states without intervention by the control circuitry 40, but the control circuitry 40 can intervene into the operation of the state machine 18, for example to assert a reset signal to cause the state machine 18 to revert to a non-data transmission state, such as a standby state. The power control circuitry 42 controls the power state of the transmitter 12, in particular by setting the voltage level which is provided to each of the components of the transmitter 12 and any required associated signals to indicate to those components that the transmitter is moving into a low-power mode or back out into an active power mode. The power control circuitry 42 receives various inputs from the components of the transmitter 12. One input comes from the control circuitry 40 which is able to indicate to the control circuitry 42 that the transmitter should be moved into a low power (e.g. "sleep") state independently of the current state held by the state machine 18. For example, this may be carried out in a situation where the control circuitry 40 asserts the reset signal to the state machine 18 and simultaneously signals to the power control circuitry 42 that the transmitter should be moved into its low-power state. The power control circuitry 42 also receives an input from the state machine 18, which during normal operation of the transmitter 12 (i.e. when the control circuitry does not intervene in the usual transitions between states held by the state machine 18) is used by the state machine 18 to indicate that it has moved the transmitter into a low-power state and accordingly the power control circuitry 42 should cause the transmitter 12 to enter that low power state, or when the state machine 18 indicates to the power control circuitry 32 that it has moved the state to an active state held by the state machine in response to which the power control circuitry 42 should cause the components of the transmitter 12 to "wake up", for example returning the voltage level provided to each of the components of the transmitter 12 to a higher, active level.

When the power control circuitry 42 moves the transmitter into such a low-power state, this is signalled to the clamping circuitry 46, which is coupled to each of the buses 20, 22 and 26 of the interface 16 and the clamping circuitry 46 holds each of the bits of each of these buses in a predefined state corresponding to the low-power state of the transmitter 12. This ensures that the interface 16 is held in a well-defined state for the duration that the transmitter 12 is in its low power state, and the receiver 14 can recognise this fact and correspondingly enter its own low-power state until a change occurs in the state of the transmitter 12, at which point the power control circuitry 42 will signal to the clamping circuitry 46 that it should no longer hold the buses 20, 22 and 26 at these predefined values and should let the signals asserted on them be defined by the other components of the data transfer system. The exit of the transmitter 12 from its low-power state is recognised by the receiver 14 via its wake up circuitry 48. This wake up circuitry 48 is arranged to detect any change in the state of the signals asserted on the request bus 22, indicating that the clamping circuitry 46 has been deactivated and the transmitter 12 is seeking to resume data transfer. The wake up circuitry 48 may take a variety of forms in dependence on the nature of the state in which the clamping circuitry 46 holds the request bus 22 in the transmitter's low-power mode, as will be discussed below with reference to FIGS. 7A and 7B. When the wake up circuitry 48 recognises that the transmitter 12 has exited its low-power state it signals this fact to the receiver synchronisation circuitry 34, which itself then exits its own low-power state and resumes synchronising the signals received on the request bus 22 into the clock domain of the receiver 14. Control over the power state of the individual components of the receiver 14 may also be controlled by a power control circuit which operates in a similar manner to the power control circuitry 42 of the transmitter 12 (i.e. in that it provides the operating voltage for each of the components of the receiver 14 and thus defines whether each component is active or inactive) and when this is the case the wake up circuitry 48 may signal its wake up signal to the power control circuitry of the receiver 14, which in turn causes the components of the receiver 14 to wake up, although explicit representation of such a receiver power control circuit is not shown in FIG. 2. When the receiver 14 wakes up in this manner, the synchronised signal received on the request bus 22 is (as was described above with reference to FIG. 1) passed to the state decode circuitry 32 and the request acknowledgement circuitry 28. The transmitter 12 is similarly provided with wake up circuitry 44 which is coupled to the acknowledge bus 26 and may similarly cause the transmitter 12 to exit a low-power state when a change in at least one bit of the signal asserted on the acknowledge bus 26 occurs. This may for example happen when the transmitter 12 exits its own low-power state, asserts a corresponding transmission state on the request bus 22, and then returns to its own low-power state (under control of the state machine 18 and the power control circuitry 42), whilst it waits for the acknowledgement signal to be received from the receiver 14. In configurations in which there is expected to be a non-trivial delay between the assertion of the new transmission state on the request bus 22 and the reception of the acknowledgement state asserted by the receiver 14 on the acknowledge bus 26, power saving may thus be achieved. As mentioned above, in the context of the wake up circuitry 48 of the receiver 14, the wake up circuitry 44 can similarly provide its wake up signal directly to the transmitter synchronisation circuitry 25 in order to cause it to wake up and synchronise the received acknowledgement state into the clock domain of the transmitter 12, but the wake up circuitry (explicitly shown in the case of the transmitter 12) is also coupled to the control circuitry 40 and the power control circuitry 42 in order to allow either of these components to cause the transmitter 12 to exit its low-power state when a corresponding change in the acknowledgement signal received on the acknowledge bus 26 is received, indicating that the transmitter 12 should wake up and interpret this signal. The wake up circuitry 44 may be variously configured, in dependence on the particular nature of the acknowledgement signal maintained on the acknowledge bus 26 whilst the receiver 14 is in its low-power state, as will also be discussed below with a respect to FIGS. 7A and 7B. The receiver 14 may also be provided with clamping circuitry in order to hold the acknowledgement state on the acknowledge bus 26 in this state corresponding to the low-power state of the receiver 14, although this is not explicitly illustrated in FIG. 2.

FIG. 3A is a table showing set of valid transmission states defined according to the communication protocol of one embodiment where the request bus carries a three-bit signal. Notice that the set of valid transmission states thus comprises three "one-hot" states corresponding to standby, and data transfer, whilst the standby state is also used to indicate a power-down state of the transmitter and an additional test mode may also be signalled by the assertion of all three bits of the request bus. Notice also that the Hamming distance of the pattern of both ones and zeroes in the set of valid transmission states shown in FIG. 3A is at least one between any individual pair of states. As will become apparent from the following discussion, this supports a communication arrangement between the transmitter and the receiver, where intermediate transmission states which are not part of the set of valid transmission states are not (albeit temporarily) interpreted as an assertion of a genuine state of the transmitter. Moreover, note that the set of valid acknowledgement states shown in FIG. 3 have a constant parity value (i.e. in this case being 1) such that the receiver can readily distinguish between valid and invalid transmission states with reference to the parity value of the three-bit signal.

FIG. 3B shows a table corresponding to the table of FIG. 3A, for the transmission states which can be read by the receiver. Note that the set of states shown in FIG. 3B represent all possible permutations of a three-bit signal, allowing for the fact that intermediate states of the request signal may be read by the receiver, before the transition of the transmission state asserted by the transmitter settles in its movement from one valid transmission state to another. For example, note that a valid transmission state for standby/power-down is defined according to the tables of FIGS. 3A and 3B as 001. When the transmitter moves from this state into data transfer (A), i.e. by asserting 010 on the request bus, the fact that the interface between the transmitter and the receiver may cross between notably different voltage domains for the transmitter and receiver respectively can result in different propagation times for rising and falling edges of the three-bit signal. This then means that an intermediate state in the transition of the asserted state on the request bus from 001 to 010 of 011 may occur when the middle bit (RXREQ_i[1]) transitions to high before the least significant bit (RXREQ_i[0]) transitions to low. Nevertheless, the communication protocol used by the transmitter and receiver is defined such that this intermediate state of 011 is recognised as being an illegal or transitory state and the receiver is configured not to misinterpret this as a valid (intended) transmission state indicated by the transmitter. Similarly, the state 110 is defined as illegal or transitory, such that when the signal asserted on the request bus moves between data-transfer (A) 010 and data-transfer (B) 100, the intermediate state of 110 which may result because the transition of the most significant bit (RXREQ_i[2]) from 0 to 1 occurs before the transition of the middle bit (RXREQ_i[1]) transitions from 1 to 0. Note also that the transmission state on the request bus of 000 is defined as illegal in terms of valid data transfer via the data bus and this state is used by the transmitter to indicate that it is currently in its low-power state in which the request bus is clamped-low by its clamping circuitry.

When the receiver recognises one of the valid transmission states on the request bus it is responsive to this situation to acknowledge this recognition on the acknowledge bus, and FIGS. 3C and 3D show tables of two sets of valid acknowledgement states which may be used by the receiver to indicate an acknowledgement state to the transmitter. Note that the table of FIG. 3C is identical to that of FIG. 3A (substituting TXREQ for RXACK), in that when using the set of valid acknowledgement states defined according to FIG. 3C, the receiver simply reflects the valid transmission state which it reads from the request bus onto the acknowledge bus as its own acknowledgement signal to the receiver. FIG. 3D shows an alternative set of valid acknowledgement states which may be used by the receiver, indicating that (compare again to FIG. 3A) the set of valid acknowledgement states need not be bit-identical with the set of valid transmission states. In the example of FIG. 3D it will be recognised that the set of valid acknowledgement states is a code rotation of the set of valid transmission states shown in FIG. 3A. Generally, any set of valid acknowledgement states may be defined (so long as it also adheres to the rule that the pattern of zeroes (ones) in individual acknowledgement states of this set must have a Hamming distance from the pattern of zeroes (ones) of another acknowledgment state of at least one) and as long as the transmitter understands the meaning of the acknowledgement states in their particular correspondence in meaning to its own asserted transmission state. FIG. 3E shows a set of acknowledgement states (some valid, some invalid) which the transmitter is arranged to interpret from the acknowledge bus. In the example of FIG. 3E these correspond to the asserted receiver acknowledge states shown in FIG. 3C. Note that the states defined in FIG. 3E are identical to those defined in FIG. 3B (with the substitution of TXACK for RXREQ) and a repeat discussion of the individual possibilities for these states is not made here, noting that the same principle as was discussed with reference to FIG. 3B applies here in that the valid transmission states are interspersed by illegal or transitory states allowing for the fact that the transmission of the acknowledgement state via the acknowledge bus between different voltage domains may result in a situation in which one bit of the acknowledgement signal transitions faster than another.

Figure 4:
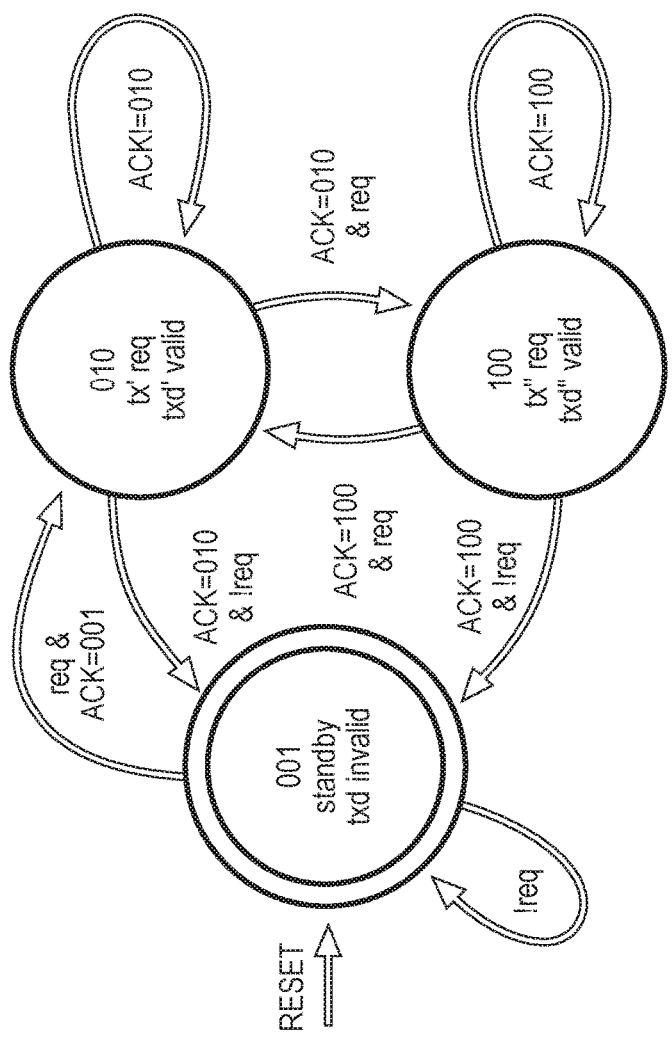
FIG. 4 shows a state diagram for the transmitter and the conditions for transition between these states in one embodiment.

FIG. 4 shows a three-state graph showing the three-transmitter states which may for example be maintained by the state machine 18 of the transmitter 12 shown in FIGS. 1 and 2. The state maintained according to FIG. 4 is initialised at reset (for example when the state machine 18 is reset by the control circuitry 40) into the quiescent "standby" state. Note that the three states shown in FIG. 4 correspond to the first three states shown in the table of FIG. 3A. In FIG. 4 the label "txd" corresponds to the transfer of data via the data bus 20, such that "txd invalid" indicates that the data transmission circuitry 24 of the transmitter 12 is not currently asserting valid data on the data bus 20, whilst the states "txd' valid" and "txd" valid" indicate the data transfer (A) and data transfer (B) states in which the data transmission circuitry 24 is asserting valid data on the data bus 20. The label ACK is shorthand for the three-bit acknowledge value, which in this example corresponds to the set of values shown in the table of FIG. 3C, which must match the current request state value being broadcast to complete the transaction.

Figure 5:
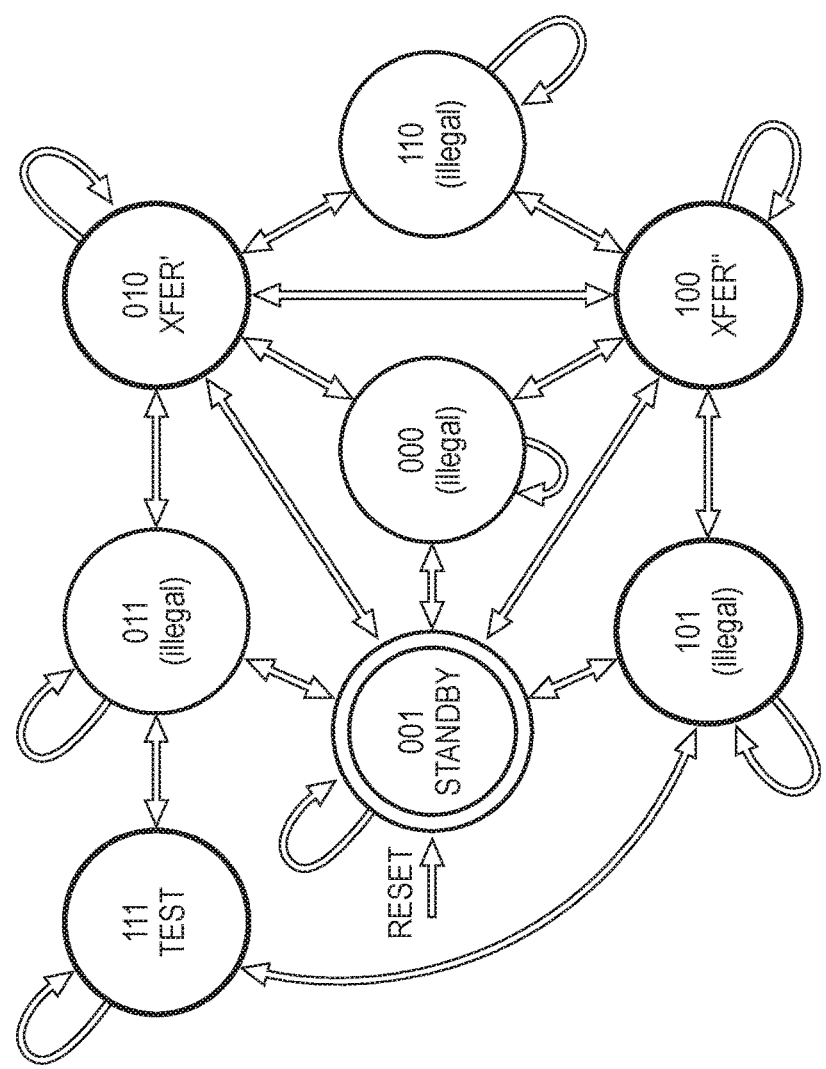
FIG. 5 shows a state diagram corresponding to the interpretation of received transmission states read from the request bus by the receiver in one embodiment.

Accordingly, from the initial standby state 001, this state will be maintained until new data is valid and ready to be transferred ("req") and the receiver has responded to the transmission state of 001 asserted on the request bus by replying with a corresponding assertion of 001 on the acknowledge bus. The state of the transmitter is then transitioned to the data transfer (A) state 010, with this transmission state being asserted on the request bus by the transmitter. Whilst the receiver response (ACK) does not match this asserted transmission state (010) then the transmitter is held in this state. Once the receiver responds with the matching acknowledgement of the signal (010), and will then also have sampled the data bus, if there is no longer valid data being asserted by the transmitter on the data bus (!req), then the transmitter state is transitioned back to the standby state 001. If, however, there is further valid data to be transferred (req) then the transmitter state is transitioned to the data transfer (B) state 100 and the data transmission circuitry 24 asserts the next valid state of data to be transferred via the data bus. From the data transfer (B) state 100, a matching acknowledgement signal ACK=100 is required to be received from the receiver before the transmitter state is transitioned. Similarly to the above described transitions from the data transfer (A) state 010, once the valid acknowledgement signal (in this case ACK=100) is received and if there is no longer valid data to be transferred (!req) then the transmitter state is transitioned back to the standby state 001. If however there is further data to be transferred, then the reception of the valid acknowledgement signal ACK=100 (by which time the receiver will have again sampled the data bus) causes the transmitter state to be transitioned back to the data transfer (A) state 010. Thus, whilst there continues to be valid data to be transferred via the data bus, and the receiver correctly acknowledges the received state of the transmitter asserted by the transmitter on the request bus, the state of the transmitter is cycled between the data transfer states (A) and (B) (i.e. between the indicated states 010 and 100 in FIG. 4) for this continuing data transfer to take place. Note that any change in the data value to be transferred must be propagated on a state change (i.e. a transition from one of the data transfer states (A/B) to the other) and preserved until the receiver has acknowledged the receipt of this state change correctly.

Where FIG. 4 corresponds to the example set of transmission states given in the table of FIG. 3A, FIG. 5 shows a state graph corresponding to the decoding of the request bus by the receiver, corresponding to the states shown in the table of FIG. 3B. Note however that where FIG. 4 did not illustrate the use of the test mode signalling (merely for clarity of illustration), this state is shown in FIG. 5. It can be seen from FIG. 5 that the illegal/transitory states are positioned to cover the cases where a rising edge propagates faster than a falling edge or vice versa. For example, in a transition from the standby state 001 to the first data transfer state 010, the faster propagation of a rising edge than a falling edge can result in an intermediate state of 011 being detected, which the receiver recognises as such and does not respond to. Overall, these illegal states cover the situations in which either one or two inputs can be detected high at a time (if rise time handshake signal propagation is faster than fall time), or no inputs have valid non-zero signal values (if fall time propagation is faster than rise time, or if an isolation strategy of clamp low has been applied to all three request signals).

This configuration of the decoding of the request bus by the receiver, and the corresponding acknowledgement state which is then transmitted back to the transmitter when a valid transmitter state has been recognised on the request bus, provides that, in this three-bit example, the handshake protocol between the transmitter and the receiver is mediated by a six-wire interface and the protocol ensures that both a high-to-low and a low-to-high pair of transmissions is transmitted in each direction, from transmitter to receiver for the request and from receiver to transmitter for the acknowledge. This then means that both rising and falling edge timing is fully accounted for in the transfer handshake, allowing the bundle of data with arbitrary high-to-low and low-to-high transitions to be sampled safely at the receiver.

Additionally, FIG. 5 also shows the test mode 111, this encoding having been selected such that this valid (but special) transmitter state cannot be illegally generated within the transitions between the regular data transfer states (i.e. 001, 010 and 100). Example usage of this test mode is discussed below with reference to FIG. 9.

Figure 6:
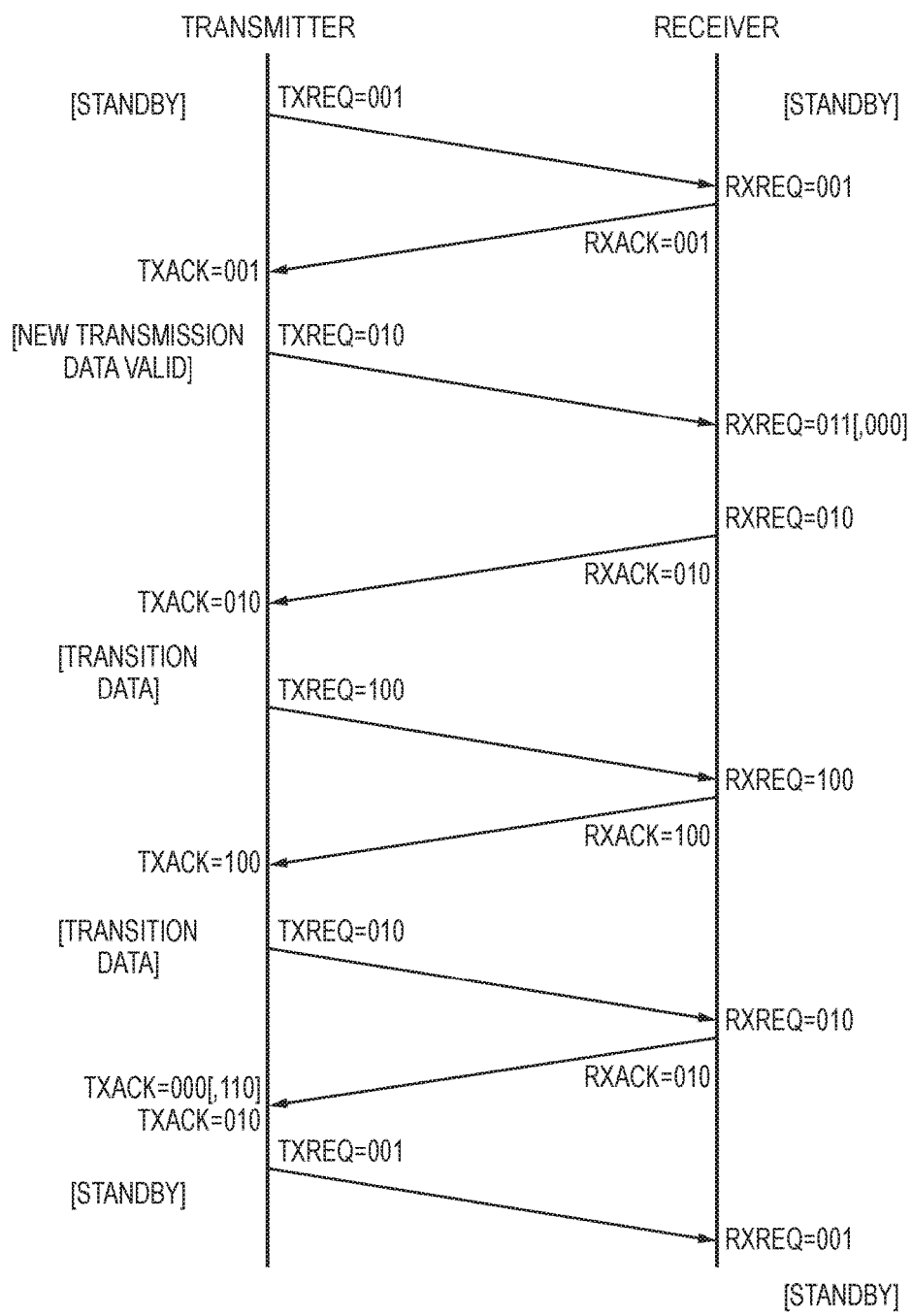
FIG. 6 shows an example sequence of signals exchanged between a transmitter and a receiver in one embodiment.

FIG. 6 shows an example set of signals exchanged between the transmitter and the receiver in one embodiment of the data transfer system. The transmitter begins in its standby state which it indicates on the request bus with TXREQ=001. This is correctly decoded by the receiver (as RXREQ=001), and the receiver asserts the acknowledge signal RXACK=001 on the acknowledge bus. This is received by the transmitter as TXACK=001. Then the transmitter sets up the new valid data on the data bus and its state is transitioned to the first data transfer state (A) and the transmission state TXREQ=010 is asserted on the request bus. However, due to the fact that a rising edge on the request bus has a slightly faster transmission time than a falling edge, this change of state is initially decoded by the receiver as RXREQ=011. Since this is defined as an illegal/transitory state, the receiver does not assert a corresponding state on the acknowledgement bus. Note (for comparison) that in FIG. 6 the alternative illegal intermediate state RXREQ=000 is also shown in square brackets, which could result from a configuration in which a falling edge is propagated from the transmitter to the receiver faster than a rising edge. However, once the propagation of the transmitter state on the request bus is correctly established at the receiver end, it is decoded by the receiver as RXREQ=010. This being a valid transmission state, the receiver then asserts the acknowledge signal RXACK=010 on the acknowledge bus. In this example there is no significant difference between the rising and falling edge transmission times on the acknowledge bus and the transmitter decodes the received acknowledge signal as TXACK=010.

The transmitter having thus received the correct acknowledgement for the transmission state which it has asserted, along with the initial state of the data to be transferred, then transitions to the other data transmission state (B) and the transmission state TXREQ=100 is asserted on the request bus. In FIG. 6 this is shown as being correctly received by the receiver as RXREQ=100 (although it should be recognised that illegal intermediate states of RXREQ=000 and 110 could also be temporarily seen by the receiver at this point). The valid transmission state causes the receiver to assert the acknowledge signal RXACK=100 on the acknowledge bus and this is correctly decoded by the transmitter as TXACK=100. The transmitter can then transition the asserted data once more. The transmitter then transitions back to the data transfer state (A), and correspondingly asserts the status TXREQ=010 on the request bus. This is shown in FIG. 6 as being correctly received by the receiver as RXREQ=010, and the resulting acknowledgement signal RXACK=010 being asserted on the acknowledge bus. FIG. 6 however gives the example of this particular acknowledge signal being temporarily decoded in an illegal state by the transmitter, namely as TXACK=000 (since the falling edge transmission has occurred faster than the rising edge transmission although the alternative illegal intermediate state of TXACK=110 is also shown which would result if the rising edge outstripped the falling edge). Once TXACK is correctly decoded as 010 when the edge transitions have settled, the transmitter can once again transition its state. In the example shown in FIG. 6 for illustrative purposes this is to return the transmitter to its standby state, but it will be appreciated that a typical sequence of events will comprise repeated transitions between the two data transfer states (A) and (B) so that a useful quantity of data, involving many transitions, can be transferred from the transmitter to the receiver. However, for simplicity of illustration the example of the transmitter now returns to standby as shown in FIG. 6 and the transmitter state asserted on the request bus TXREQ=001 is correctly decoded by the receiver as RXREQ=001 and the receiver also then enters its standby state.

Figure 7A:
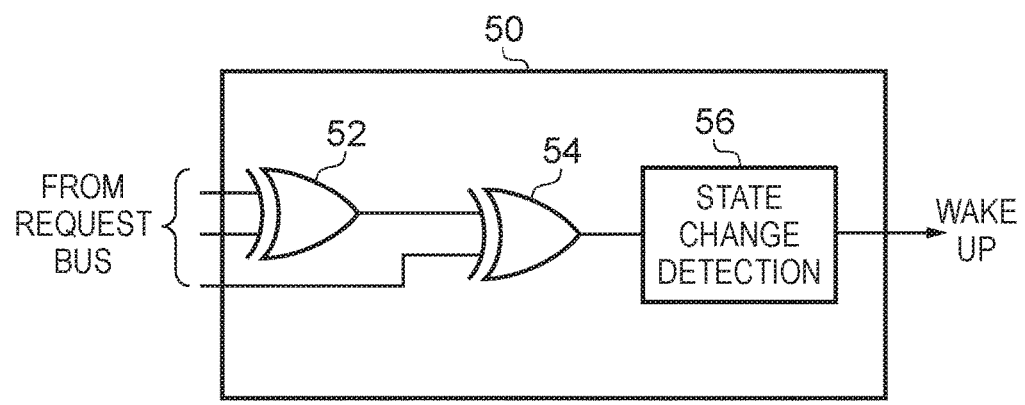
FIGS. 7A and 7B schematically illustrate the configuration of wake up circuitry in respective embodiments.
Figure 7B:
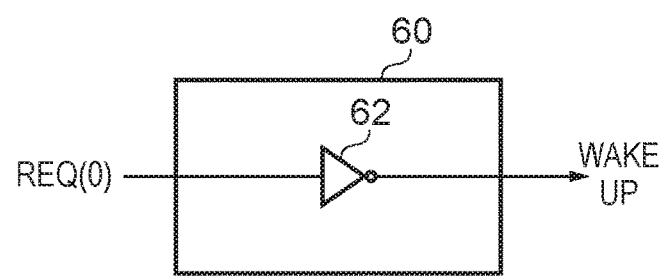

FIGS. 7A and 7B schematically illustrate two example configurations of the wake up circuitry 44 and 48 shown in FIG. 2. As mentioned above, the receiver 14 can use the wake up circuitry 48 to monitor the state of the request bus 22, in order to detect when the transmitter 12 has exited its low-power state and is seeking to commence data transfer. In the example configuration shown in FIG. 2 the transmitter 12 comprises clamping circuitry 46 which holds the three-bit request bus 22 with low values on each bit whilst the transmitter is in its low-power state. Accordingly, the example wake up circuitry 50 may be used for the wake up circuitry 48 of the receiver 14 to monitor when a change occurs from this "clamped low" state, this monitoring being provided in the wake up circuitry 50 by the XOR gates 52 and 54 which feed into the state change detection circuitry 56. Thus, when any of the bits of the request bus change value this will be detected by the state change detection circuitry 56, which in turn then generates the wake up signal which (as described above) is used to trigger various components of the receiver 14 to exit a lower power mode, in particular the request synchronisation circuitry 34.

A simple configuration of the wake up circuitry may be provided by the example wake up circuitry 60 shown in FIG. 7B, which may for example be employed where the clamping circuitry (for example clamping circuitry 46 of the transmitter 12 in FIG. 2) is arranged to hold the request bus in a state corresponding to the "standby/power-down" state shown in the first line of FIG. 3A, namely 001. In other words, bit [0] is clamped high, whilst bits [2:1] are clamped low. In this situation monitoring for the exiting of the transmitter from its powered down state only requires monitoring of the bit [0], namely that if this bit is not active then signalling is being requested. Accordingly, the wake up circuitry 60 shown in FIG. 7B corresponding to this situation comprises NOT gate 62 which simply inverts the value detected on this bit to provide the wake up signal.

Figure 8:
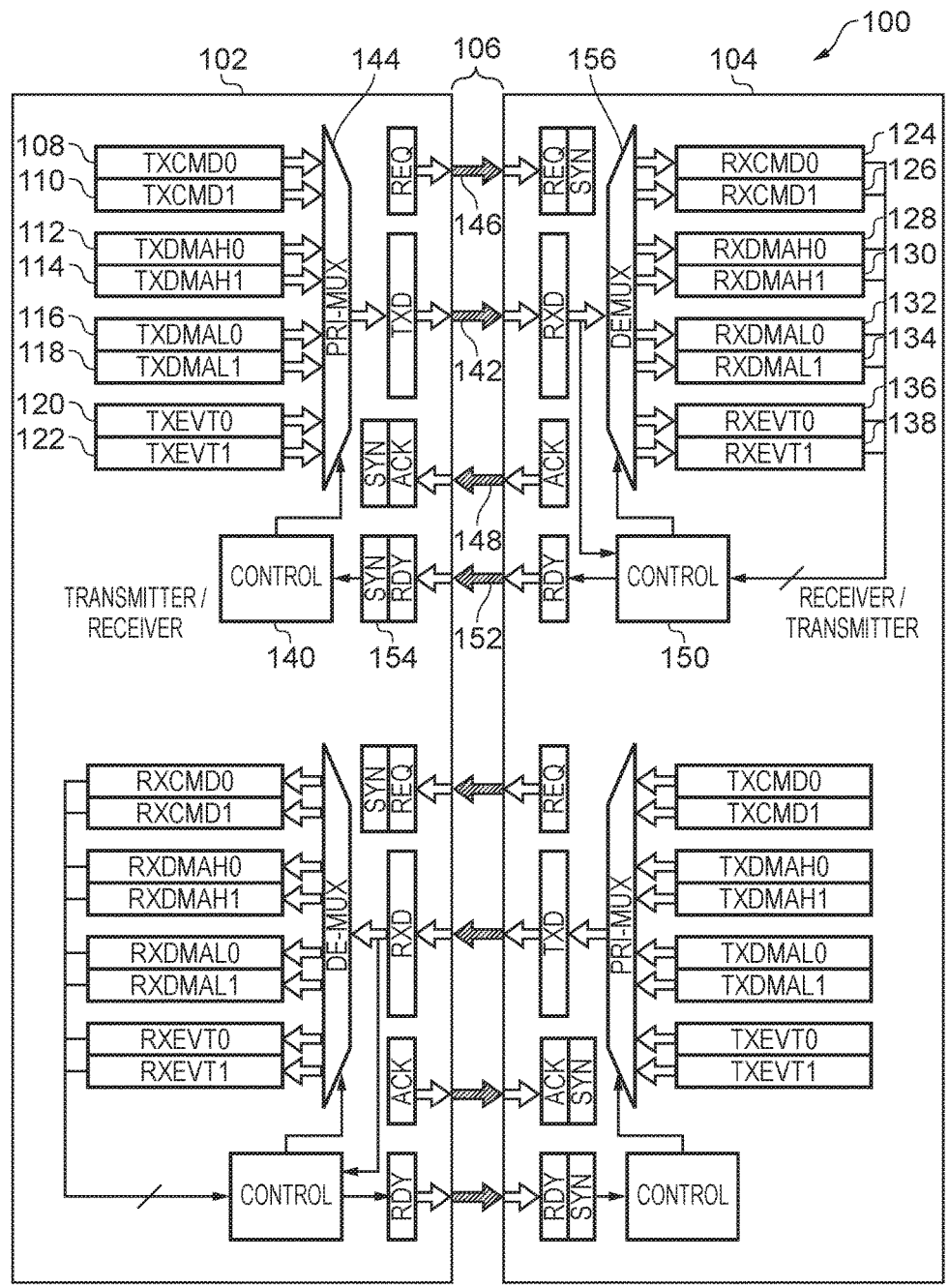
FIG. 8 schematically illustrates a data transfer system in which four non-blocking virtual data transmission channels are supported in each direction across the interface in one embodiment.

FIG. 8 schematically illustrates a data transfer system 100 comprising two components 102 and 104 which exchange data. This exchange of data is full-duplex (i.e. bi-directional) and hence in its upper part FIG. 8 shows the transfer of data from component 102 to component 104, whilst in its lower part FIG. 8 shows the transfer of data from component 104 to component 102. For this reason, these two components are labelled "transmitter/receiver" 102 and "receiver/transmitter" 104, but it will be appreciated that they are essentially symmetrical in terms of their data exchange. In each direction there are four non-blocking virtual channels, identified by the label portions CMD, DMAH, DMAL, and EVT. The transmitter/receiver 102 comprises eight buffers 108-122, which hold respective values to be transmitted via the data bus for each of these virtual channels, wherein the buffers are paired (suffixes 0 and 1) to hold two subsequent values for transmission via each virtual channel. Correspondingly, the receiver/transmitter 104 comprises eight reception buffers 124-138. Transmitter/receiver 102 comprises a control unit 140 which is arranged to select between the virtual channels for the transmission of data via the data bus 142, by control over the multiplexer 144. Once a virtual channel has been selected for data transmission in this manner, the assertion of a request signal on the request bus 146, the return of an acknowledge signal on the acknowledge bus 148 and so on, takes place as described above, for example with reference to the embodiments shown in FIGS. 1 and 2, and further detail of the process is not described here for brevity. However, one mechanism via which the control circuitry 140 selects a virtual channel for data transmission is on the basis of readiness signals which it receives which are transmitted via a corresponding control unit 150 in the receiver/transmitter 104. This control circuitry 150 receives signals from each of the data reception buffers 124-138, indicative of whether the corresponding buffer is available for the reception of data. For example, whilst a buffer is holding a value before that value has been read by a further component of the system, it is not available for further data reception. Once this data item has been passed further into the readout chain, then the corresponding data reception buffer can indicate that it is ready. The readiness signals received by the control circuitry 150 are communicated to the control circuitry 140 via a readiness bus 152 provided for this purpose. In an alternative embodiment (in which the readiness bus could be omitted) the readiness signals are transmitted on the acknowledge bus 148, with a predefined signal protocol communicating the state of one or more of the data reception buffers. In a similar manner to that described above with reference to the reception of the request signals from request bus 22 by the request synchronisation circuitry 34 of the receiver 14 in FIG. 1, the transmitter/receiver 102 comprises synchronisation circuitry 154, which is arranged to independently synchronise these readiness signals into the clock domain of the transmitter/receiver 102. The manner in which the control circuitry units 140 and 150 select a virtual channel for data transfer may vary, but FIG. 8 illustrates that control circuitry 150 can also control the demultiplexer 156 in order to couple the request bus 142 to the appropriate data reception buffer, when the control circuitry 150 indicates to the control circuitry 140 that this particular data reception buffer is ready for data reception. FIG. 8 also illustrates that at least part of the data transmitted can also be passed to the control unit 150, and any given data packet transmitted may contain a destination register tag indicating the data reception buffer to which this data packet should be steered. The control unit 150 can thus read this tag, and control the demultiplexer 156 accordingly, in order to couple the request bus 142 to the appropriate data reception buffer.

The data transmission capability of the receiver/transmitter 104 and the data reception capability of the transmitter/receiver 102 (lower part of FIG. 8) directly mirrors the above description, with each of the respective signals passing in the opposite direction and is not described again here.

Figure 9:
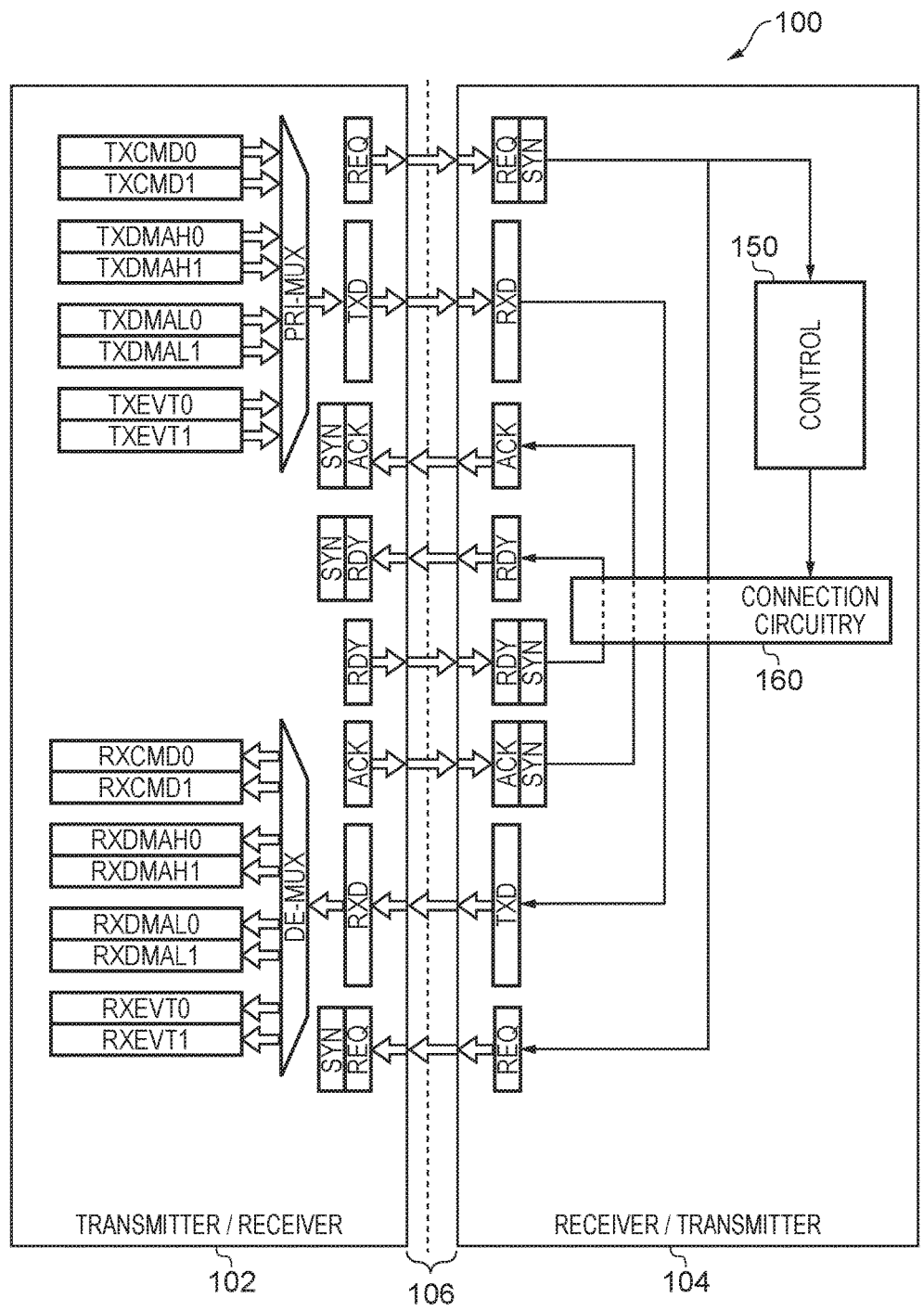
FIG. 9 schematically illustrates the couplings within the receiver of FIG. 8 when an interface loop-back test mode is used in one embodiment.

One particular usage of the transmitter/receiver 102 and receiver/transmitter 104 of the data transfer system 100 is shown in FIG. 9, namely in a configuration in which the transmitter/receiver 102 transitions into its interface loopback test mode. When the transmitter/receiver 102 does this, and (according to the communication protocol set out above) this is recognised by the receiver/transmitter 104, the receiver/transmitter 104 makes use of connection circuitry 160 under the control of control circuitry 150 to couple each of the respective reception sub-components it comprises to corresponding transmission components as illustrated in FIG. 9. Thus configured, this enables the transmitter/receiver 102 to fully exercise the wiring of the interface 106 to carry out any desired tests (such as bit ordering checks) without needing to have knowledge of the detail of the receiver/transmitter 104 with which it is communicating. It will be recognised that although the transmitter/receiver 102 and receiver/transmitter 104 of FIGS. 8 and 9 are essentially of symmetrical configuration, this need not be the case.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data transfer system comprising:
   a data bus, a request bus and an acknowledge bus;
   a transmitter to assert a current transmission state on the request bus in accordance with a communication protocol, wherein the current transmission state is indicative of a state of the transmitter with respect to data transfer via the data bus; and
   a receiver to read a received transmission state from the request bus in accordance with the communication protocol and to assert an acknowledgement state on the acknowledge bus when the received transmission state is a valid transmission state of a set of valid transmission states according to the communication protocol,
   wherein the transmitter is arranged to read a received acknowledgement state from the acknowledge bus in accordance with the communication protocol, and the transmitter is responsive to reception of a valid acknowledgement state of a set of valid acknowledgement states according to the communication protocol, when the valid acknowledgement state matches the state of the transmitter, to transition the state of the transmitter with respect to data transfer via the data bus,
   wherein a Hamming distance between patterns of zeroes, and a Hamming distance between patterns of ones, in valid transmission states of the set of valid transmission states is at least one,
   and wherein a Hamming distance between patterns of zeroes, and a Hamming distance between patterns of ones, in valid acknowledgement states of the set of valid acknowledgement states is at least one.

2. The data transfer system as claimed in claim 1, wherein the set of valid transmission states and the set of valid acknowledgement states each have constant parity value.

3. The data transfer system as claimed in claim 1, wherein the set of valid transmission states and the set of valid acknowledgement states each comprise a test mode state which has the constant parity value.

4. The data transfer system as claimed in claim 3, wherein the data bus comprises a transmitter-to-receiver data bus and a receiver-to-transmitter data bus, and the receiver is responsive to the received transmission state being the test mode state to transmit on the receiver-to-transmitter data bus data received on the transmitter-to-receiver data bus.

5. The data transfer system as claimed in claim 1, wherein a bit pattern of the acknowledgement state asserted on the acknowledge bus by the receiver is identical to the received transmission state read by the receiver from the request bus.

6. The data transfer system as claimed in claim 1, wherein a bit pattern of the acknowledgement state asserted on the acknowledge bus by the receiver is non-identical to the received transmission state read by the receiver from the request bus.

7. The data transfer system as claimed in claim 1, wherein the set of valid transmission states and the set of valid acknowledgement states each comprise a standby state in which the transmitter does not seek to perform data transfer via the data bus.

8. The data transfer system as claimed in claim 7, wherein the transmitter comprises clamping circuitry to hold the current transmission state asserted on the request bus in the standby state, and the transmitter is arranged to enter a transmitter low-power state when the clamping circuitry holds the current transmission state asserted on the request bus in the standby state, and the receiver is responsive to reading the standby state from the request bus to enter a receiver low-power state.

9. The data transfer system as claimed in claim 8, wherein the standby state is a multi-bit signal in which a single bit is asserted, and the receiver comprises wake-up circuitry responsive to the single bit not being asserted to cause the receiver to exit the low-power state.

10. The data transfer system as claimed in claim 1, wherein the transmitter comprises clamping circuitry to hold the current transmission state asserted on the request bus in a powered-down state which is not comprised in the set of valid transmission states according to the communication protocol, and the transmitter is arranged to enter a transmitter low-power state when the powered-down state is asserted on the request bus, and the receiver is responsive to reading the powered-down state from the request bus to enter a receiver low-power state.

11. The data transfer system as claimed in claim 10, wherein the request bus is clamped active-low for the powered-down state.

12. The data transfer system as claimed in claim 10, wherein the receiver comprises wake-up circuitry responsive to a change in value of any bit on the request bus to cause the receiver to exit the receiver low-power state.

13. The data transfer system as claimed in claim 10, wherein when the transmitter exits the transmitter low-power state in preparation for data transfer via the data bus and asserts the current transmission state on the request bus, the transmitter is arranged to enter a transmitter low-power mode until a change in the received acknowledgement state occurs on the acknowledge bus.

14. The data transfer system as claimed in claim 1, wherein the set of valid transmission states comprises two active data transmission states used by the transmitter when actively asserting valid data on the data bus, and any active change in a data value asserted on the data bus by the transmitter is accompanied by a change between the two active data transmission states.

15. The data transfer system as claimed in claim 14, wherein the receiver is responsive to reading one of the two active data transmission states from the request bus to sample data from the data bus.

16. The data transfer system as claimed in claim 1, wherein the transmitter and the receiver are in different clock domains, and
   the receiver comprises receiver synchronisation circuitry to sample the request bus in a clock domain of the receiver to provide signals for receiver decode circuitry to determine the received transmission state, and
   the transmitter comprises transmitter synchronisation circuitry to sample the acknowledgment bus in a clock domain of the transmitter to provide signals for transmitter decode circuitry to determine the received acknowledgement state.

17. The data transfer system as claimed in claim 1, wherein the receiver comprises multiple data reception buffers individually corresponding to multiple data sources of data to be transferred via the data bus,
   the multiple data reception buffers are each arranged to provide a readiness signal for transmission to the transmitter, and
   the transmitter is responsive to at least one readiness signal indicating that the corresponding data reception buffer is ready to receive data to select a data source for data transfer via the data bus and to indicate the data source via the data bus.

18. The data transfer system as claimed in claim 17, comprising a readiness bus to carry the readiness signals for the multiple data reception buffers.

19. The data transfer system as claimed in claim 17, wherein the acknowledgment bus is arranged to carry the readiness signals for the multiple data reception buffers.

20. A method of data transfer in a data transfer system comprising a data bus, a request bus and an acknowledge bus, the method comprising the steps of:
asserting a current transmission state of a transmitter on the request bus in accordance with a communication protocol, wherein the current transmission state is indicative of a state of the transmitter with respect to data transfer via the data bus;
reading a received transmission state from the request bus in accordance with the communication protocol;
asserting an acknowledgement state on the acknowledge bus when the received transmission state is a valid transmission state of a set of valid transmission states according to the communication protocol;
reading a received acknowledgement state from the acknowledge bus in accordance with the communication protocol; and
transitioning the state of the transmitter with respect to data transfer via the data bus on reception of a valid acknowledgement state of a set of valid acknowledgement states according to the communication protocol, when the valid acknowledgement state matches the state of the transmitter,
wherein a Hamming distance between patterns of zeroes, and a Hamming distance between patterns of ones, in valid transmission states of the set of valid transmission states is at least one,
and wherein a Hamming distance between patterns of zeroes, and a Hamming distance between patterns of ones, in valid acknowledgement states of the set of valid acknowledgement states is at least one.

21. A transmitter comprising:
state transmission circuitry to assert a current transmission state on a request bus in accordance with a communication protocol, wherein the current transmission state is indicative of a state of the transmitter with respect to data transfer via a data bus; and
state reception circuitry to read a received acknowledgement state from an acknowledge bus in accordance with the communication protocol,
wherein the transmitter is responsive to reception of a valid acknowledgement state of a set of valid acknowledgement states according to the communication protocol, when the valid acknowledgement state matches the state of the transmitter, to transition the state of the transmitter with respect to data transfer via the data bus,
wherein a Hamming distance between patterns of zeroes, and a Hamming distance between patterns of ones, in valid transmission states of the set of valid transmission states is at least one,
and wherein a Hamming distance between patterns of zeroes, and a Hamming distance between patterns of ones, in valid acknowledgement states of the set of valid acknowledgement states is at least one.

* * * * *